United States Patent

Holey et al.

(10) Patent No.: US 10,884,507 B2
(45) Date of Patent: Jan. 5, 2021

(54) GESTURE CONTROLLED DOOR OPENING FOR ELEVATORS CONSIDERING ANGULAR MOVEMENT AND ORIENTATION

(71) Applicant: Otis Elevator Company, Farmington, CT (US)

(72) Inventors: Gaurav Holey, Maharashtra (IN); Anil Thirumalasetti, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/453,039

(22) Filed: Jun. 26, 2019

(65) Prior Publication Data

US 2020/0019247 A1 Jan. 16, 2020

(30) Foreign Application Priority Data

Jul. 13, 2018 (IN) .............................. 201811026175

(51) Int. Cl.
*G06F 3/01* (2006.01)
*G06F 3/16* (2006.01)
*H04R 1/02* (2006.01)

(52) U.S. Cl.
CPC .............. *G06F 3/017* (2013.01); *G06F 3/165* (2013.01); *H04R 1/028* (2013.01)

(58) Field of Classification Search
CPC .......... G06F 3/017; G06F 3/165; H04R 1/028
See application file for complete search history.

(56) References Cited

U.S. PATENT DOCUMENTS

| | | |
|---|---|---|
| 5,284,225 A | 2/1994 | Platt |
| 5,329,075 A | 7/1994 | Hirabayashi et al. |
| 5,518,086 A | 5/1996 | Tyni |
| 7,165,655 B2 | 1/2007 | Cook et al. |
| 7,992,687 B2 | 8/2011 | Yumura et al. |
| 8,904,708 B2 | 12/2014 | Zacchio et al. |
| 9,317,134 B2 | 4/2016 | Clarkson et al. |
| 9,477,317 B1* | 10/2016 | Clements ................ G06F 3/017 |
| 9,751,727 B1 | 9/2017 | Novak |
| 2010/0321289 A1* | 12/2010 | Kim ........................ G06F 3/017 345/156 |

(Continued)

FOREIGN PATENT DOCUMENTS

| | | |
|---|---|---|
| CN | 107337066 A | 11/2017 |
| EP | 3141510 A1 | 3/2017 |
| JP | 2017124899 A | 7/2017 |

OTHER PUBLICATIONS

European Search Report for application EP 19186152.5, dated Nov. 28, 2019, 15 pages.

*Primary Examiner* — Dmitriy Bolotin
(74) *Attorney, Agent, or Firm* — Cantor Colburn LLP

(57) ABSTRACT

A detection system is provided. The detection system includes gesture sensors installed on front panels of a set of hall doors. The gesture sensors detect motion. The detection system includes a gesture detection unit that controls operations of the gesture sensors. The gesture detection unit analyzes the motion detected by the gesture sensors and detects a pre-determined hand gesture format. The gesture detection unit activates a door open operation for the set of hall doors in response to detecting the pre-determined hand gesture format.

11 Claims, 5 Drawing Sheets

(56) References Cited

U.S. PATENT DOCUMENTS

| | | | |
|---|---|---|---|
| 2011/0080490 A1* | 4/2011 | Clarkson | G06T 7/70 |
| | | | 348/222.1 |
| 2014/0282275 A1* | 9/2014 | Everitt | G06F 3/017 |
| | | | 715/863 |
| 2015/0007042 A1* | 1/2015 | Gay | G06F 3/04883 |
| | | | 715/744 |
| 2015/0266700 A1 | 9/2015 | Salmikuukka | |
| 2016/0179205 A1* | 6/2016 | Katz | G06F 3/013 |
| | | | 345/156 |
| 2016/0194181 A1 | 7/2016 | Wang et al. | |
| 2016/0311646 A1 | 10/2016 | Bryant et al. | |
| 2017/0144859 A1* | 5/2017 | Scoville | G06K 9/6202 |

* cited by examiner

GESTURE CONTROLLED DOOR OPENING FOR ELEVATORS CONSIDERING ANGULAR MOVEMENT AND ORIENTATION

FOREIGN PRIORITY

This application claims priority to Indian Patent Application No. 201811026175, filed Jul. 13 2018, and all the benefits accruing therefrom under 35 U.S.C. § 119, the contents of which in its entirety are herein incorporated by reference.

BACKGROUND

The embodiments herein overcome deficiencies of door controllers for elevator doors utilizing legacy door sensing mechanisms comprising tactile sensor implementations. Tactile sensors are safety measures intended to prevent elevator doors from closing on a person or object. In this regard, upon contact (e.g., detection of the person or the object between the elevator doors), the tactile sensors cause the elevator doors to open rather than close.

However, passengers sometimes ignore the intended safety use and utilize tactile sensors to prevent the elevators doors from closing to catch an elevator. These passengers will use an arm, a leg, a briefcase, or the like during a minimal door opening situation to trip the tactile sensors and cause the elevator doors to reverse from closing.

BRIEF SUMMARY

According to one or more embodiments, a detection system is provided. The detection system comprises one or more gesture sensors installed on front panels of a set of hall doors, the one or more gesture sensors being configurable to detect motion; and a gesture detection unit that controls operations of the one or more gesture sensors, the gesture detection unit being configurable to analyze the motion detected by the one or more gesture sensors and detect a pre-determined hand gesture format, the gesture detection unit being configurable to activate a door open operation for the set of hall doors in response to detecting the pre-determined hand gesture format.

According to one or more embodiments or the above detection system embodiment, the detection system can include an illumination strip installed on a floor in front of the set of hall doors, the illumination strip being configurable to provide visual notifications of a door operation, the gesture detection unit controlling operations of the illumination strip.

According to one or more embodiments or any of the above detection system embodiments, the detection system can include one or more speakers providing audible notifications in accordance with commands from the gesture detection unit.

According to one or more embodiments or any of the above detection system embodiments, the detection system can be in communication with a door control subsystem that controls operations of the set of hall doors.

According to one or more embodiments or any of the above detection system embodiments, the one or more gesture sensors can generate a detection zone for detecting at least one user.

According to one or more embodiments or any of the above detection system embodiments, at least two of the one or more gesture sensors can detect the at least one user before motion detection is enabled.

According to one or more embodiments or any of the above detection system embodiments, the gesture detection unit can apply digital filters to the motion to output a pattern that is compared to a list of motions formats to determine whether the pre-determined hand gesture format is found within the motion.

According to one or more embodiments, an elevator system is provided. The elevator system comprising: a door control subsystem that controls operations of the set of hall doors; and a detection system in communication the door control subsystem, the detection system comprising: one or more gesture sensors installed on front panels of the set of hall doors, the one or more gesture sensors being configurable to detect motion, and a gesture detection unit that controls operations of the one or more gesture sensors, the gesture detection unit being configurable to analyze the motion detected by the one or more gesture sensors and detect a pre-determined hand gesture format, the gesture detection unit being configurable to activate a door open operation for the set of hall doors in response to detecting the pre-determined hand gesture format.

According to one or more embodiments or the above elevator system embodiment, the detection system can include an illumination strip installed on a floor in front of the set of hall doors, the illumination strip being configurable to provide visual notifications of a door operation, the gesture detection unit controlling operations of the illumination strip.

According to one or more embodiments or any of the above elevator system embodiments, the detection system can include one or more speakers providing audible notifications in accordance with commands from the gesture detection unit.

According to one or more embodiments or any of the above elevator system embodiments, the one or more gesture sensors can generate a detection zone for detecting at least one user.

According to one or more embodiments or any of the above elevator system embodiments, at least two of the one or more gesture sensors can detect the at least one user before motion detection is enabled.

According to one or more embodiments or any of the above elevator system embodiments, the gesture detection unit can apply digital filters to the motion to output a pattern that is compared to a list of motions formats to determine whether the pre-determined hand gesture format is found within the motion.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
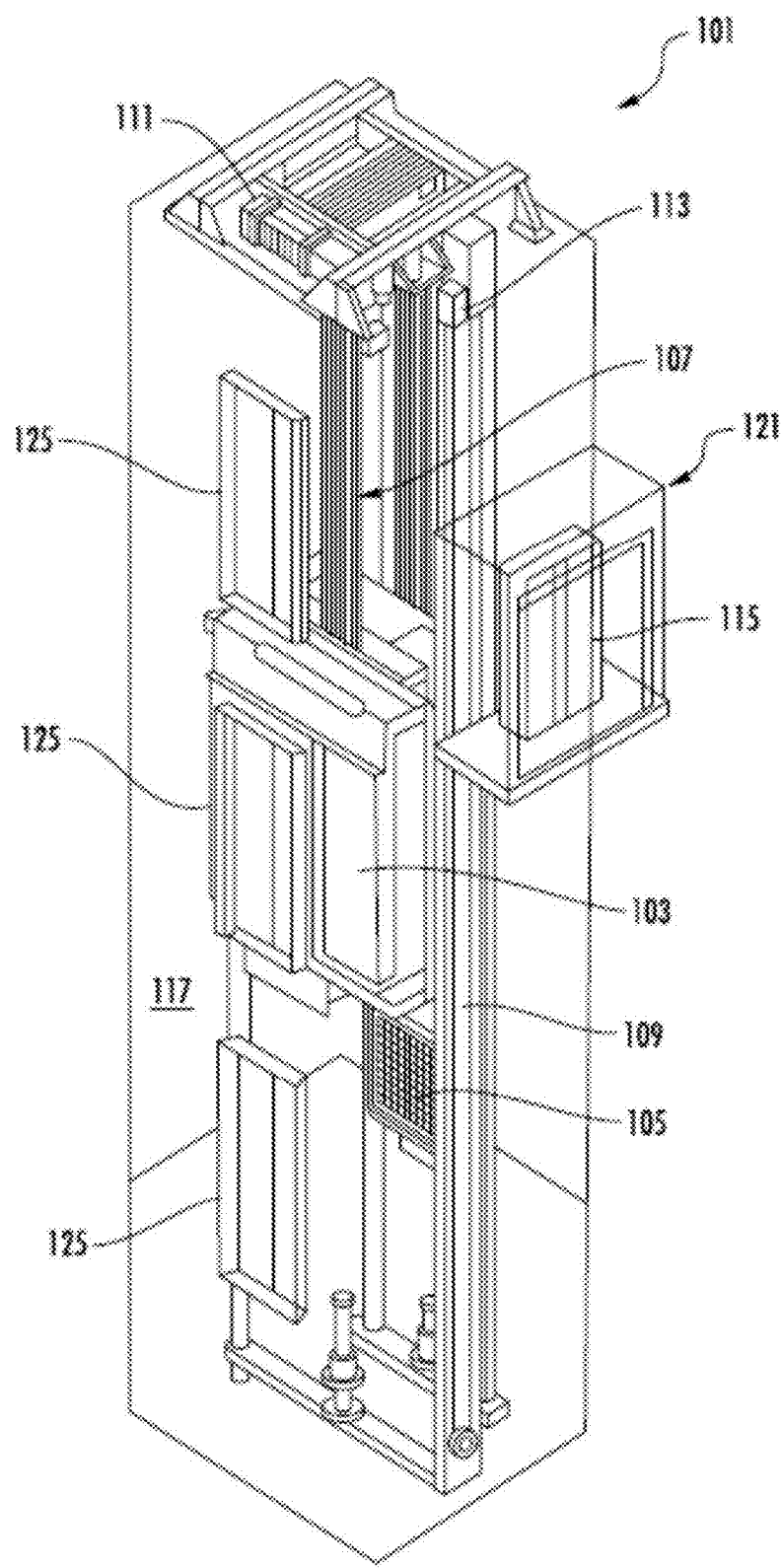
FIG. 1 depicts a schematic illustration of an elevator system in accordance with one or more embodiments.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
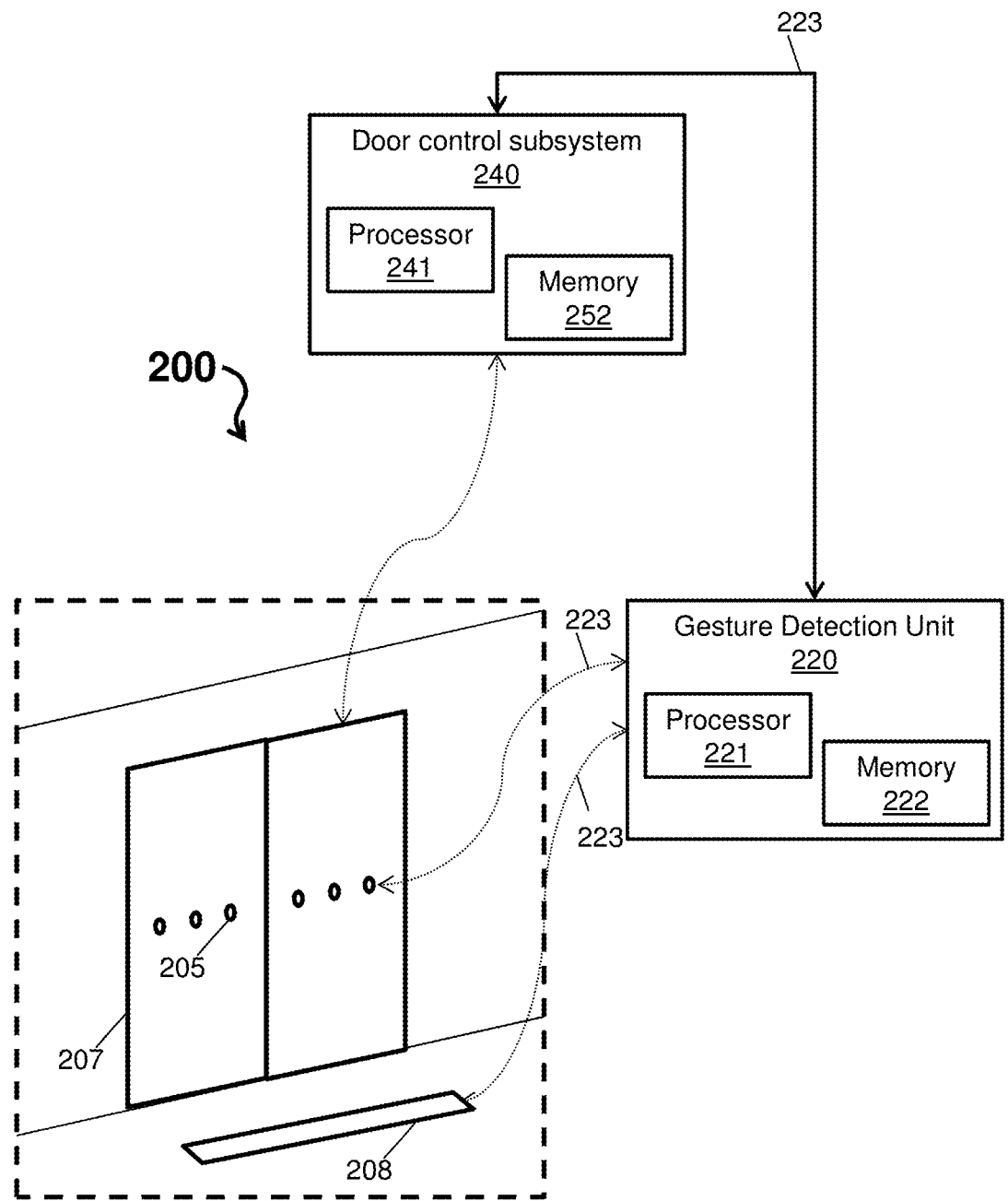
FIG. 2 depicts a schematic illustration of a detection system in accordance with one or more embodiments.

FIG. 2 depicts a schematic illustration of a detection system 200 in accordance with one or more embodiments. The detection system 200 may be included in the elevator system 101 of FIG. 1. In general, the detection system 200 comprises one or more gesture sensors 205 installed on front panels of a set of hall doors 207 and an illumination strip 208 installed on a floor in front of the set of hall doors 207. The one or more gesture sensors being configurable to detect motion. The illumination strip 208 is both optional for the detection system 200 and configurable to provide visual notifications.

The detection system 200 also comprises a gesture detection unit 220 that controls the operations of the one or more gesture sensors 205 and the illumination strip 208. The gesture detection unit 220 comprises a processor, a memory with gesture detection software and/or software stored thereon, and other hardware for communication 223 with the one or more gesture sensors 205 and the illumination strip 208. The gesture detection unit 220 is configurable to analyze the motion detected by the one or more gesture sensors 205 and detect any pre-determined hand gesture format, e.g., an angular movement and orientation of a hand itself. The gesture detection unit 220, upon detecting the pre-determined hand gesture format via the one or more gesture sensors 205, notify/command a door control subsystem 210 that to activate a door open operation. The gesture detection unit 220, upon detecting the pre-determined hand gesture format via the one or more gesture sensors 205, notify/command the illumination strip 208 to provide visual notifications (indicative of door operations). Optionally, one or more speakers may be included in the detection system 200 for audible notifications in accordance with commands from the gesture detection unit 220.

The detection system 200 can be in communication 229 with the door control subsystem 240 that controls operations of the set of hall doors 207. The door control subsystem 240 also comprises a processor 241 and a memory 242. The door control subsystem 240 may include and be is in sync with existing legacy door sensing mechanisms.

The technical effects and benefits of the detection system 200 include gesture based door operations that improves a passenger experience, along with implementing gesture based hall call capabilities. The technical effects and benefits of the detection system 200 include improving passenger safety during door operations by providing visible and/or audible notifications informing passengers to keep a safe distance from the elevator door (to provide smooth de-boarding and on-boarding of the elevator). The technical effects and benefits of the detection system 200 include eliminating door stuck problems, which are responsible for major service turn-backs, based on improper passenger use of the tactile sensors.

Figure 3:
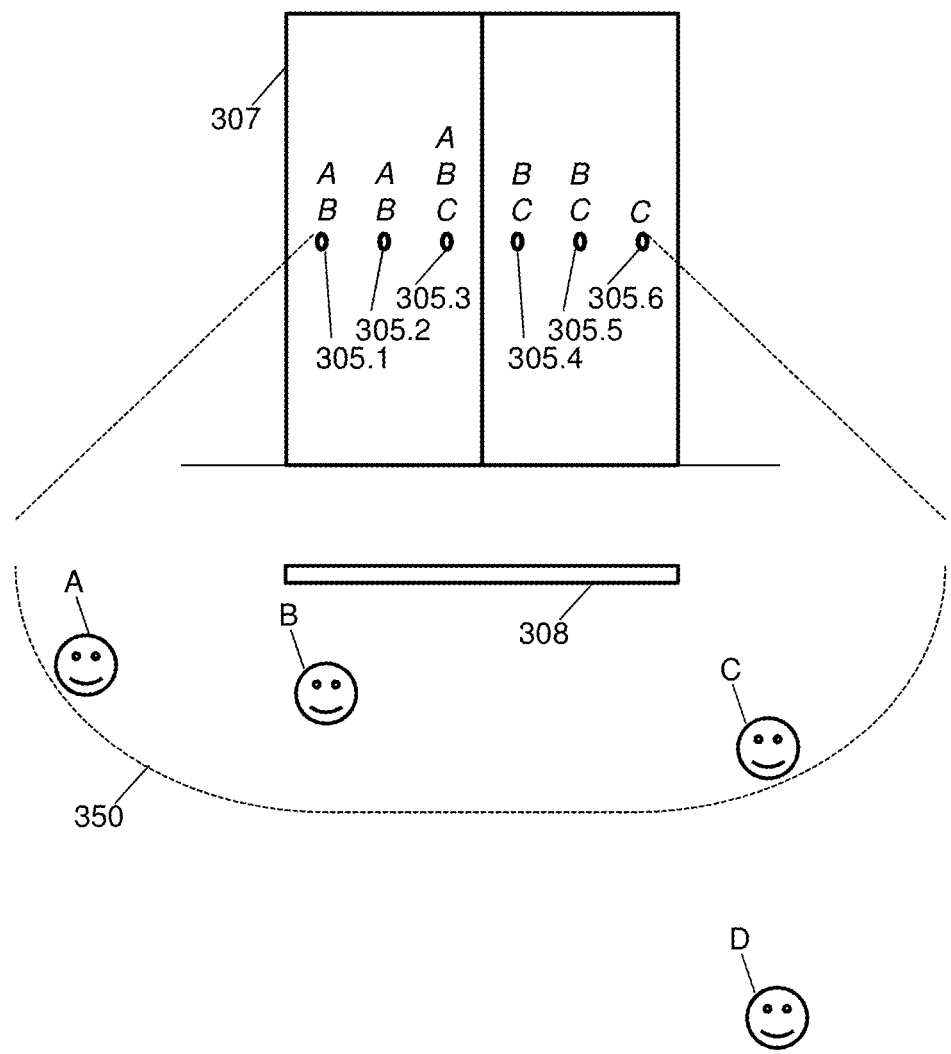
FIG. 3 depicts detection operations of a detection system in accordance with one or more embodiments.

FIG. 3 depicts detection operations of a detection system (such as the detection system 200 of FIG. 2) in accordance with one or more embodiments. The detection operations include one or more gesture sensors 305 installed on front panels of a set of hall doors 307. The one or more gesture sensors 305 detect users A, B, C, and D and detect their motions. In response, an (optional) illuminated strip 308 can provide notifications to the users A, B, C, and D.

As shown in FIG. 3, the one or more gesture sensors 305 generate a detection zone 350 in front of the set of hall doors 307. The detection zone 350 is utilized to determine when a passenger (e.g., one of the users A, B, and C) is in range for detecting their motion. For instance, the user A is detected by the gesture sensors 305.1, 305.2, and 305.3, and thus is determined to be within the detection zone 350. Further, the user B is determined to be within the detection zone 350 because the gesture sensors 305.1, 305.2, 305.3, 305.4, and 305.5 have detected the user B; the user C is determined to be within the detection zone 350 because the gesture sensors 305.3, 305.4, 305.5, and 305.6 have detected the user C; the user D is determined not to be within the detection zone 350 as no gesture sensors 305 have detected the user D.

Figure 4:
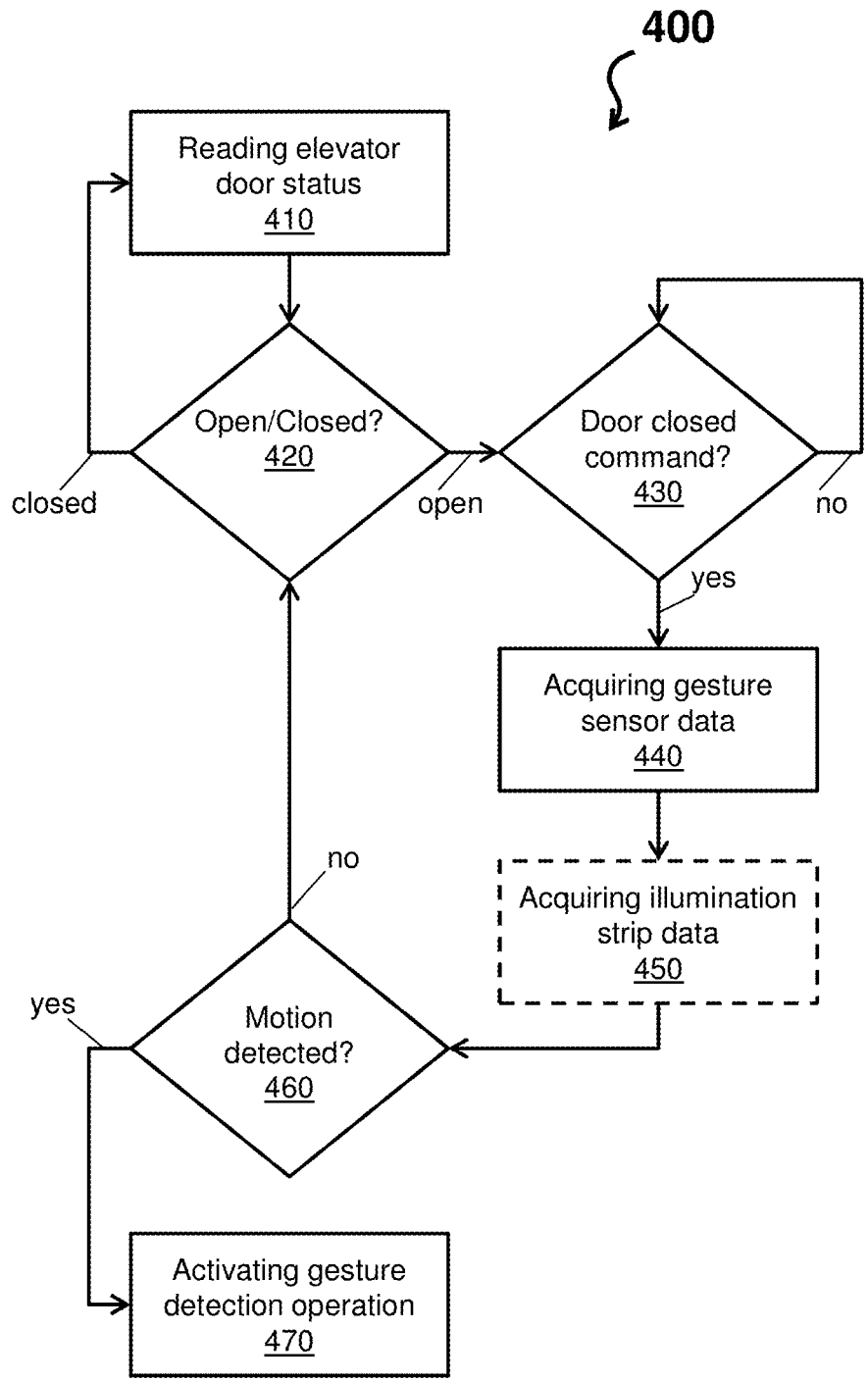
FIG. 4 depicts a process flow of a detection system in accordance with one or more embodiments.

In accordance with one or more embodiments, when two or more gesture sensors 305 notify a gesture detection unit (e.g., the gesture detection unit 220 of FIG. 2) that a user is within a detection zone. For instance, at least two of the one or more gesture sensors 305 detect at least one user before motion detection is enabled by the gesture detection unit. Once motion detection is enabled in response to the at least two gesture sensors detection a user, the gesture detection unit awaits motion data from those two or more gesture sensors 305 for analysis. Turning now to FIG. 4, a process flow 400 of a detection system is depicted in accordance with one or more embodiments. The process flow 400 is an example of a detection operation by the two or more gesture sensors 305 and the gesture detection unit.

The process flow 400 begins at block 410, where the gesture detection unit reads an elevator door status. The gesture detection unit may read the elevator door status from a door control subsystem (e.g., the door control subsystem 240 of FIG. 2). At decision block 420, the gesture detection unit determines if the elevator door status is open or closed. If the elevator door status is closed, the process flow 400 returns to block 410 (via the closed arrow) where the elevator door status is read again. If the elevator door status is open, the process flow 400 proceeds to decision block 430 (via the closed arrow) where the gesture detection unit determines if a door closed command has been generated by the door control subsystem. If the door closed command has not been generated, the process flow 400 returns to decision block 430 (via the no arrow). If the door closed command has been generated, the process flow 400 proceeds to block 440 (via the yes arrow).

At block 440, the gesture detection unit acquires gesture sensor data. Acquiring gesture sensor data may include detecting one or more users in the detection zone. At dashed-block 450 (note the dashed border indicated that this step is optional), the gesture detection unit acquires illumination strip data. Acquiring illumination strip data may include determining a visual notification status of the illumination strip (e.g., the illumination strip 208 of FIG. 2 and the illumination strip 308 of FIG. 3).

At decision block 460, the gesture detection unit determines whether one or more motions were made by the one or more users in the detection zone. If one or more motions were not found, then the process flow 400 returns to decision block 420. If the one or more motions were found, then the process flow 400 proceeds to block 470. At block 470, the gesture detection unit activates a gesture detection operation.

Figure 5:
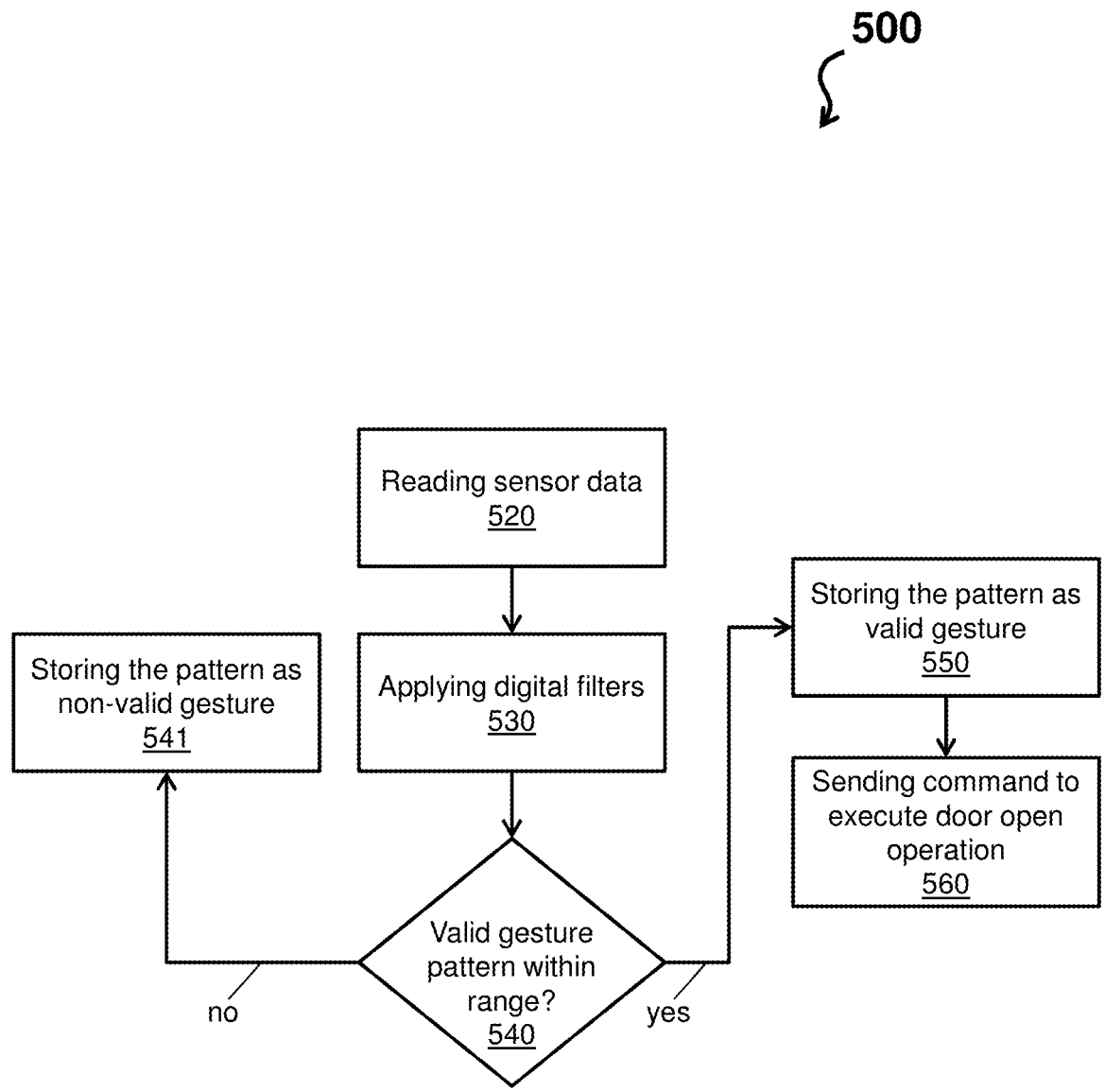
FIG. 5 depicts a process flow of a detection system in accordance with one or more embodiments.

Turning now to FIG. 5, a process flow 500 of a detection system is depicted in accordance with one or more embodiments. The process flow 500 is an example of activating the gesture detection operation. The process flow 500 begins at block 530, where the gesture detection unit reads sensor data from one or more gesture sensors. The sensor data includes one or more motions by at least one user in the detection zone. At block 540, the gesture detection unit applies digital filters to the sensor data. For example, the gesture detection unit determines whether a pre-determined hand gesture format is found within the one or more motions. The digital filters output patterns from the one or more motions that are compared to a list of motions formats. The list of motions formats can be stored on the memory of the gesture detection unit (e.g., the memory 220 of FIG. 2). Examples of motions formats, i.e., pre-determined hand gesture format, include waving, saluting, pointing, thumbs-up motions, etc.

Moving onto decision block 540, if a valid gesture pattern is not found within a range (e.g., if the pre-determined hand gesture format is not found within the detection zone), then the process flow 500 proceeds to block 541. At block 541, the gesture detection unit stores the pattern as non-valid gesture (for future use to accelerate motion recognition by the detection system). If the valid gesture pattern is found within a range (e.g., if the pre-determined hand gesture format is found within the detection zone), then the process flow 500 proceeds to block 570. At block 570, the gesture detection unit stores the pattern as a valid gesture. At block 580, the gesture detection unit sends a command (to the door control subsystem) to execute door open operation.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A detection system comprising:
   one or more gesture sensors installed on front panels of a set of hall doors, the one or more gesture sensors being configurable to detect motion; and
   a gesture detection unit that controls operations of the one or more gesture sensors, the gesture detection unit being configurable to analyze the motion detected by the one or more gesture sensors and detect a pre-determined hand gesture format, the gesture detection unit being configurable to activate a door open operation for the set of hall doors in response to detecting the pre-determined hand gesture format;
   wherein the detection system comprises an illumination strip installed on a floor in front of the set of hall doors, the illumination strip being configurable to provide visual notifications of a door operation, the gesture detection unit controlling operations of the illumination strip, the gesture detection unit acquiring illumination strip data.

2. The detection system of claim 1, wherein the detection system comprises one or more speakers providing audible notifications in accordance with commands from the gesture detection unit.

3. The detection system of claim 1, wherein the detection system is in communication with a door control subsystem that controls operations of the set of hall doors.

4. The detection system of claim 1, wherein the one or more gesture sensors generate a detection zone for detecting at least one user.

5. The detection system of claim 4, wherein at least two of the one or more gesture sensors detect the at least one user before motion detection is enabled.

6. The detection system of claim 1, wherein the gesture detection unit applies digital filters to the motion to output a pattern that is compared to a list of motions formats to determine whether the pre-determined hand gesture format is found within the motion.

7. An elevator system comprising:
   a door control subsystem that controls operations of the set of hall doors; and
   a detection system in communication the door control subsystem, the detection system comprising:
   one or more gesture sensors installed on front panels of the set of hall doors, the one or more gesture sensors being configurable to detect motion, and
   a gesture detection unit that controls operations of the one or more gesture sensors, the gesture detection unit being configurable to analyze the motion detected by the one or more gesture sensors and detect a pre-determined hand gesture format, the gesture detection unit being configurable to activate a door open operation for the set of hall doors in response to detecting the pre-determined hand gesture format;
   wherein the detection system comprises an illumination strip installed on a floor in front of the set of hall doors, the illumination strip being configurable to provide visual notifications of a door operation, the gesture detection unit controlling operations of the illumination strip, the gesture detection unit acquiring illumination strip data.

8. The elevator system of claim 7, wherein the detection system comprises one or more speakers providing audible notifications in accordance with commands from the gesture detection unit.

9. The elevator system of claim 7, wherein the one or more gesture sensors generate a detection zone for detecting at least one user.

10. The elevator system of claim 9, wherein at least two of the one or more gesture sensors detect the at least one user before motion detection is enabled.

11. The elevator system of claim 7, wherein the gesture detection unit applies digital filters to the motion to output a pattern that is compared to a list of motions formats to determine whether the pre-determined hand gesture format is found within the motion.

* * * * *